United States Patent
Hirakawa

(10) Patent No.: US 9,894,333 B2
(45) Date of Patent: Feb. 13, 2018

(54) LIGHT SOURCE UNIT AND IMAGE DISPLAY APPARATUS

(71) Applicant: Makoto Hirakawa, Kanagawa (JP)

(72) Inventor: Makoto Hirakawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/150,827

(22) Filed: May 10, 2016

(65) Prior Publication Data

US 2016/0344986 A1    Nov. 24, 2016

(30) Foreign Application Priority Data

May 22, 2015   (JP) .................................. 2015-104632

(51) Int. Cl.
*G02B 26/08*   (2006.01)
*H04N 9/31*    (2006.01)
(Continued)

(52) U.S. Cl.
CPC ............. *H04N 9/317* (2013.01); *B60K 35/00* (2013.01); *G02B 26/0858* (2013.01); *G02B 26/101* (2013.01); *G02B 27/0101* (2013.01); *G02B 27/104* (2013.01); *H04N 9/14* (2013.01); *H04N 9/3129* (2013.01); *H04N 9/3164* (2013.01); *B60K 2350/2056* (2013.01);
(Continued)

(58) Field of Classification Search
CPC .. G02B 27/02; G02B 26/101; G02B 26/0858; G02B 26/105; G02B 27/0966; G02B 27/0101; G02B 19/0057; G02B 19/0028; G02B 26/123; G02B 27/01; G02B 27/0172; G02B 27/18; G02B 7/02; G02B 7/021; B60K 35/00; G09F 9/00; B41J 2/47; B41J 2/473

USPC ........................................................ 359/204.1
See application file for complete search history.

(56) References Cited

U.S. PATENT DOCUMENTS

2007/0002417 A1   1/2007   Hirakawa et al.
2007/0030538 A1   2/2007   Hirakawa et al.
(Continued)

FOREIGN PATENT DOCUMENTS

JP     2001-208999      8/2001
JP     2014-235268 A   12/2014

OTHER PUBLICATIONS

Extended European Search Report dated Sep. 23, 2016 in Patent Application No. 16169412.0.

*Primary Examiner* — Euncha Cherry
(74) *Attorney, Agent, or Firm* — Oblon, McClelland, Maier & Neustadt, L.L.P.

(57) ABSTRACT

A light source unit mountable to an image display apparatus for irradiating scan light to an optical scanning system to generate an image includes a plurality of light emitters to emit corresponding lights having different wavelengths, a plurality of coupling lenses respectively disposed for the plurality of light emitters to respectively pass through the lights emitted from the plurality of light emitters, and a plurality of aperture-formed members respectively disposed for the plurality of coupling lenses to respectively pass through the lights coming from the coupling lenses, each of the plurality of aperture-formed members formed of an aperture having an aperture size set differently depending on the wavelengths of the lights emitted from the plurality of light emitters.

8 Claims, 5 Drawing Sheets

(51) Int. Cl.
*G02B 27/10* (2006.01)
*B60K 35/00* (2006.01)
*G02B 27/01* (2006.01)
*H04N 9/14* (2006.01)
*G02B 26/10* (2006.01)
*G03B 21/20* (2006.01)

(52) U.S. Cl.
CPC .... *G02B 2027/011* (2013.01); *G03B 21/2013* (2013.01); *G03B 21/2033* (2013.01)

(56) References Cited

U.S. PATENT DOCUMENTS

| | | |
|---|---|---|
| 2007/0215800 A1 | 9/2007 | Miyatake et al. |
| 2008/0180772 A1 | 7/2008 | Miyatake et al. |
| 2008/0204541 A1* | 8/2008 | Tan ................. G02B 26/101 347/232 |
| 2009/0060582 A1 | 3/2009 | Ichii et al. |
| 2009/0195849 A1 | 8/2009 | Ichii et al. |
| 2009/0214261 A1 | 8/2009 | Hirakawa et al. |
| 2009/0251753 A1 | 10/2009 | Hirakawa et al. |
| 2010/0097679 A1 | 4/2010 | Hirakawa |
| 2012/0177409 A1 | 7/2012 | Arai et al. |
| 2013/0063754 A1 | 3/2013 | Saisho et al. |
| 2013/0107233 A1 | 5/2013 | Hirakawa et al. |
| 2013/0107234 A1 | 5/2013 | Nishina et al. |
| 2013/0114053 A1 | 5/2013 | Tatsuno et al. |
| 2013/0188004 A1 | 7/2013 | Arai et al. |
| 2014/0118818 A1 | 5/2014 | Nishina et al. |
| 2014/0126045 A1 | 5/2014 | Tatsuno et al. |
| 2015/0062696 A1 | 3/2015 | Tatsuno et al. |
| 2015/0070741 A1* | 3/2015 | Bowron ............ G03B 21/005 359/223.1 |
| 2015/0234158 A1 | 8/2015 | Tatsuno et al. |

* cited by examiner $\theta 2 > \theta 1, \theta 2 > \theta 3$ $\theta 2 > \theta 1, \theta 2 > \theta 3$

LIGHT SOURCE UNIT AND IMAGE DISPLAY APPARATUS

CROSS-REFERENCE TO RELATED APPLICATION

This application claims priority pursuant to 35 U.S.C. § 119(a) to Japanese Patent Application No. 2015-104632, filed on May 22, 2015 in the Japan Patent Office, the disclosure of which are incorporated by reference herein in their entirety.

BACKGROUND

Technical Field

The present disclosure relates to a light source unit and an image display apparatus.

Background Art

Image display apparatuses such as head up displays (HUD) are disposed to transportation vehicles such as automobiles, airplanes, and ships. The HUD can generate an intermediate image, and project and display the generated intermediate image on a windshield to provide information to an operator such as a driver.

The HUD can employ a panel system and a laser scanning system as a projection system of the intermediate image. As to the panel system, an imaging device such as a liquid crystal device and a digital mirror device projects the intermediate image. As to the laser scanning system, a light source unit including a laser diode (light emitter) emits a laser beam, and then a two dimensional scanning device scans the laser beam to project the intermediate image.

SUMMARY

As one aspect of the present invention, a light source unit mountable to an image display apparatus for irradiating scan light to an optical scanning system to generate an image is devised. The light source unit includes a plurality of light emitters to emit corresponding lights having different wavelengths, a plurality of coupling lenses respectively disposed for the plurality of light emitters to respectively pass through the lights emitted from the plurality of light emitters, and a plurality of aperture-formed members respectively disposed for the plurality of coupling lenses to respectively pass through the lights coming from the coupling lenses, each of the plurality of aperture-formed members formed of an aperture having an aperture size set differently depending on the wavelengths of the lights emitted from the plurality of light emitters.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
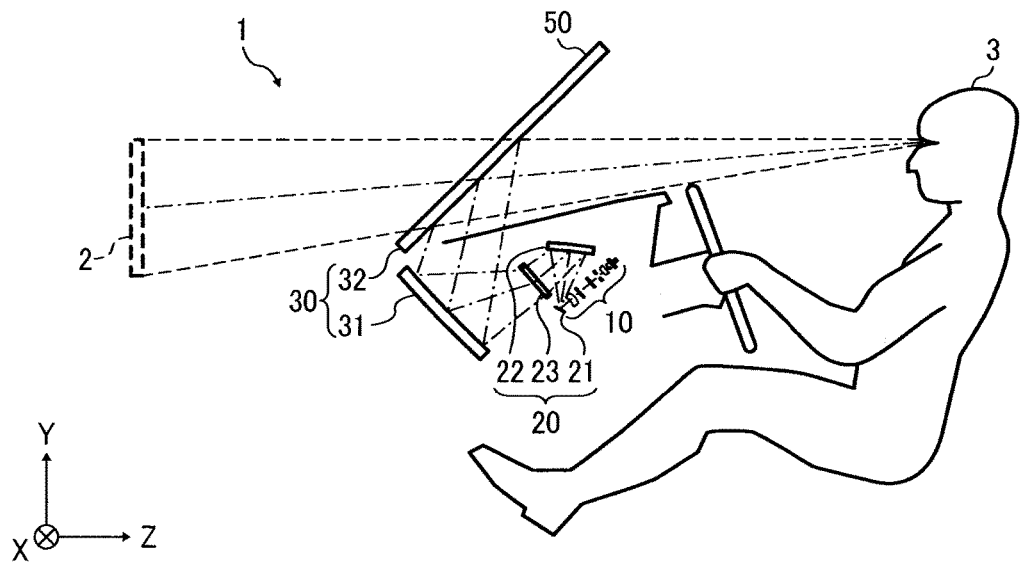
FIG. 1 is an example of a head up display (HUD), which is an example of an image display apparatus according to one or more example embodiments of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, apparatus or system according to one or more example embodiments are described hereinafter.

A description is given of a light source unit and an image display apparatus according to one or more example embodiments with reference to the drawings.

First Example of Image Display Apparatus

A description is given of the image display apparatus of a first example of this disclosure with reference to the drawings. As illustrated in FIG. 1, the image display apparatus of the first example such as a head up display (HUD) includes, for example, a light source unit 10, an optical scanning system 20, and an optical projection system 30.
(Overall Configuration of HUD)

The HUD 1 can be mounted to, for example, vehicles used for various applications including transportation vehicles such as automobiles, ships, and airplanes but not limited these. Hereinafter, a description is given of the HUD 1 mountable to an automobile. Hereinafter, the automobile is used as an example of transportation vehicles, which are simply referred to as the vehicle. The HUD 1 can be applied to various fields such as commercial vehicles, agricultural/ construction machines, railway vehicles, airplanes, and robots, which are movable objects. Further, the HUD 1 can be applied to other fields such as factory machines, factory robots, etc. which may be fixed at one place.

The HUD 1 can display or project various information such as information of operations and controls of the vehicle on a windshield 50 as a virtual image 2, with which a user 3 (observer) can recognize the information. The windshield 50 can be a transmissive reflective element that can pass through a part of light that enters the windshield 50, and reflect a part of the remaining light, in which the windshield 50 can be used as a combiner 32.

The light source unit 10 emits image displaying beam to the optical scanning system 20 and the optical projection system 30 to generate the virtual image 2. The light source unit 10 is an example of the light source unit of this disclosure, which will be described in detail later.

Based on the image displaying beam emitted from the light source unit 10, the optical scanning system 20 generates image projection light used for displaying operational information of the vehicle. The image projection light generated by using the optical scanning system 20 can be projected onto the windshield 50 useable as the combiner 32.

The optical scanning system 20 includes, for example, a light deflector 21 used as a two dimensional deflection element, a scan mirror 22, and a scan-receiving element 23 used as an intermediate image screen. The light deflector 21 is an image generation device that deflects the image displaying beam emitted from the light source unit 10, and scans the scan-receiving element 23 two dimensionally by using the deflected image displaying beam to generate an "intermediate image." The light deflector 21 can employ micro electro mechanical systems (MEMS) having micro-oscillation mirror elements manufactured by the semiconductor manufacturing process. For example, the light deflector 21 is composed of micro reflectors (hereinafter, micro mirrors) arranged in a matrix pattern. Each of the micro mirrors is configured to oscillate about two axes perpendicular with each other, and the micro-oscillation mirror element is known as a digital micro mirror device (DMD: registered mark of Texas Instruments).

Further, the configuration of the light deflector 21 is not limited to the above described example. For example, the light deflector 21 can employ a configuration having two micro mirrors disposed for one axis to oscillate the two micro mirrors in directions perpendicular with each other about the one axis. Further, the light deflector 21 can employ a transmissive liquid crystal element having a transmissive liquid crystal panel, and the light deflector 21 can employ a reflective liquid crystal element that is a liquid crystal device having a reflective liquid crystal panel. The light deflector 21 will be described in detail later.

The scan beam deflected two dimensionally at the light deflector 21 enters the scan mirror 22. The scan mirror 22 employs, for example, a concave mirror, which is designed to correct the curving of scan lines or scan line profile to be occurred on the scan-receiving element 23. The scan beam reflected by the scan mirror 22 enters the scan-receiving element 23 while the scan beam is being shifted in parallel direction in line with the deflection operation by the light deflector 21, with which the scan-receiving element 23 is two dimensionally scanned by the scan beam along the time line.

If an optical element of transmissive liquid crystal element is employed for the light deflector 21, the scan beam deflecting two dimensionally at the transmissive liquid crystal element enters the scan-receiving element 23 without using the scan mirror 22.

The scan-receiving element 23 can be scanned two dimensionally such as the main scanning direction and sub-scanning direction by using the scan beam. Specifically, the scan-receiving element 23 can be scanned with a high speed in the main scanning direction and with a low speed in the sub-scanning direction, which is known as raster scanning. The intermediate image can be generated by performing the two dimensional scanning on the scan-receiving element 23. In this example case, the generated intermediate image is a "two dimensional color image." In this description, it is assumed that the color image is generated, but a monochrome image can be generated by using the scan-receiving element 23.

The image displayed at the scan-receiving element 23 at each moment corresponds to "pixels that are irradiated by the scan beam at the each moment." Therefore, the "two dimensional color image" corresponds to "a group of pixels displayed at the each moment" by performing the two dimensional scanning using the scan beam.

The scan-receiving element 23 can be configured with a number of micro convex lenses. With employing the micro convex lens structure, the scan beam that has entered the scan-receiving element 23 can be diffused at an exit face of the scan-receiving element 23. The diffused image projection light emitted from the scan-receiving element 23 as diffused light can be projected as the virtual image 2 by using the combiner 32. By employing this configuration, the user 3 can visually recognize the virtual image 2 effectively even if the observing point of the user 3 is moved when the user 3 moves the head a little.

Further, the structure of the scan-receiving element 23 is not limited to the micro convex lens structure such as the micro lens array. For example, the scan-receiving element 23 can employ a diffusion plate, a transmittable screen, and a reflective screen. In this description, the scan-receiving element 23 employs the micro lens array, and thereby a plurality of micro lenses is arranged two dimensionally, and further, instead of the two dimensional arrangement, the plurality of micro lenses can be arranged one dimensionally or three dimensionally.

The optical projection system 30 includes, for example, a concave mirror 31 and the combiner 32. If the windshield 50 is not a flat face member, the virtual image 2 displayed on the windshield 50 by projecting the image projection light is distorted. The concave mirror 31 is a single mirror disposed at a space between the optical scanning system 20 and the combiner 32 to correct the distortion of the virtual image 2. By disposing the concave mirror 31, the optical distortion that the horizontal line of the intermediate image becomes a convex shape into the upper or lower direction can be corrected.

In this description, the windshield 50 of the vehicle such as automobile is also used as the combiner 32, but not limited hereto. For example, instead of using the windshield 50 as the combiner 32, a separate transmissive reflection element, which is a partially-reflectable mirror, can be used as the combiner 32 that can pass through a part of light that enters the combiner 32, and reflect a part of the remaining light. Hereinafter, it is assumed that the optical projection system 30 projects the image projection light to any one of the windshield 50 and the combiner 32.

When the image projection light is projected onto the combiner 32, the virtual image 2 can be appeared in the field of view of the user 3 at a position physically distanced from the combiner 32, which is at the position distanced from the user 3 for some distance. Information related to operations of the vehicle such as navigational information of the vehicle including velocity, travel distance, and destination can be displayed as the virtual image 2.

When the windshield 50 is used as the combiner 32 to project the image projection light, the HUD 1 employs a windshield projection system. Further, when the transmissive reflection element (partially-reflectable mirror) is used as the combiner 32 separately from the windshield 50, the HUD 1 employs a combiner projection system. When the HUD 1 is mounted in the vehicle, the windshield projection system may be preferable from a viewpoint of interior appearance of the vehicle. For example, if the combiner projection system is employed for the vehicle, the separately-disposed combiner may become a prominent object in the vehicle, and may partially block the field of view of the user 3 depending on the design of the combiner.

The optical scanning system 20 that projects the intermediate image on the combiner 32 by projecting the image projection light to the combiner 32 can be embedded, for example, in a dashboard of the vehicle. The observing point of the user 3 is used as a reference position of the observing point, which indicates a reference eye point. The field of view of the user 3 is set with a level of eye range of drivers for automobiles or less defined by national standards such as Japan Industrial Standard (JIS) D0021.

Further, the image display apparatus such as the HUD 1 according to one or more example embodiments of this disclosure can omit the optical projection system 30, in which an image, generated directly from the light emitted from the light source unit 10, can be formed on a screen such as the windshield of the vehicle.

As to the one or more example embodiments of this disclosure, the three dimensional rectangular coordinate system is defined as follows. As illustrated in FIG. 1, the left-to-right direction of the field of view of the user 3 is set as the X-axis direction, in which the right hand side of the user 3 is set as +X direction, and the left hand side of the user 3 is set as −X direction. Further, the upper-to-lower direction of the field of view of the user 3 is set as Y-axis direction, in which the upper direction of the user 3 is set as +Y direction, and the lower direction of the user 3 is set as −Y direction. Further, the depth direction of the field of view of the user 3 that is a travel direction of the vehicle is set as Z-axis direction, in which the front direction of the travel direction is set as −Z direction, and the rear direction of the travel direction is set as +Z direction. Therefore, as to the three dimensional rectangular coordinate system of the one or more example embodiments, the width direction of the vehicle is set as the X-axis direction, the height direction of the vehicle is set as the Y-axis direction, and the length direction of the vehicle is set as the Z-axis direction.

(Hardware Configuration)

Figure 2:
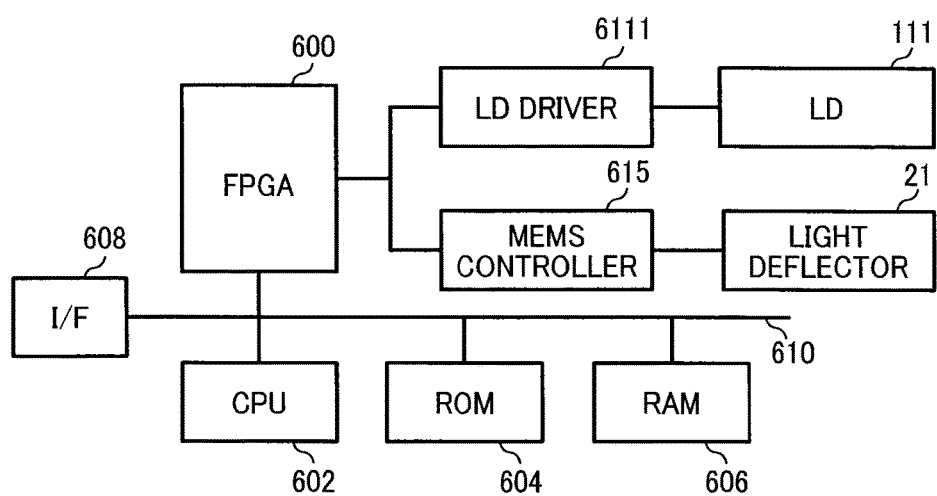
FIG. 2 is a hardware configuration of the HUD of FIG. 1.

As illustrated in FIG. 2, a hardware configuration of the HUD 1 includes, for example, a field-programmable gate array (FPGA) 600, and a central processing unit (CPU) 602. Further, the HUD 1 includes, for example, a read only memory (ROM) 604, a random access memory (RAM) 606, an interface (I/F) 608, and a bus line 610. Further, the HUD 1 includes, for example, a laser diode (LD) driver 6111, and a MEMS controller 615.

The FPGA 600 controls the LD driver 6111 and the MEMS controller 615. The LD driver 6111 activates and deactivates a laser diode (LD) 111 of the light source unit 10 under the control of the FPGA 600. The MEMS controller 615 activates and deactivates the light deflector 21 under the control of the FPGA 600. The CPU 602 controls each of units of the HUD 1. The ROM 604 stores image processing programs to be executed to control each of units of the HUD 1 by using the CPU 602. The RAM 606 is used as a working area of the CPU 602. The I/F 608 is used as an interface to communicate with an external controller. The I/F 608 can be used to connect the HUD 1 to a network inside the vehicle such as controller area network (CAN).

(Functional Configuration)

Figure 3:
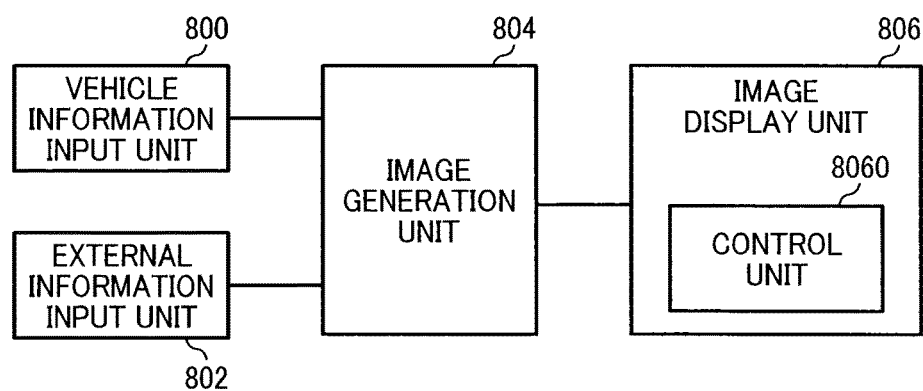
FIG. 3 is a functional configuration of the HUD of FIG. 1.

As illustrated in FIG. 3, the functional configuration of the HUD 1 includes, for example, a vehicle information input unit 800, an external information input unit 802, an image generation unit 804, and an image display unit 806. The vehicle information input unit 800 can be input with vehicle information (e.g., velocity, travel distance) from a controller area network (CAN) of the vehicle. The external information input unit 802 can be input with information outside the vehicle (i.e., external information) from an external network such as positioning information from the global positioning system (GPS). The image generation unit 804 can generate an image based on information input from the vehicle information input unit 800 and the external information input unit 802. The image display unit 806 includes a control unit 8060 that controls operations of the light source unit 10 and the optical scanning system 20. Under the control of the control unit 8060, the image projection light can be projected onto the windshield 50 by using the HUD 1. With employing the above described functional configuration, the virtual image 2 can be visually recognized in the field of view of the user 3 when the HUD 1 is activated.

First Example of Light Source Unit

A description is given of the light source unit 10 of a first example disposed for the HUD 1. As described above, the light source unit 10 of the first example is one example of the light source units of the one or more example embodiments of this disclosure.

Figure 4:
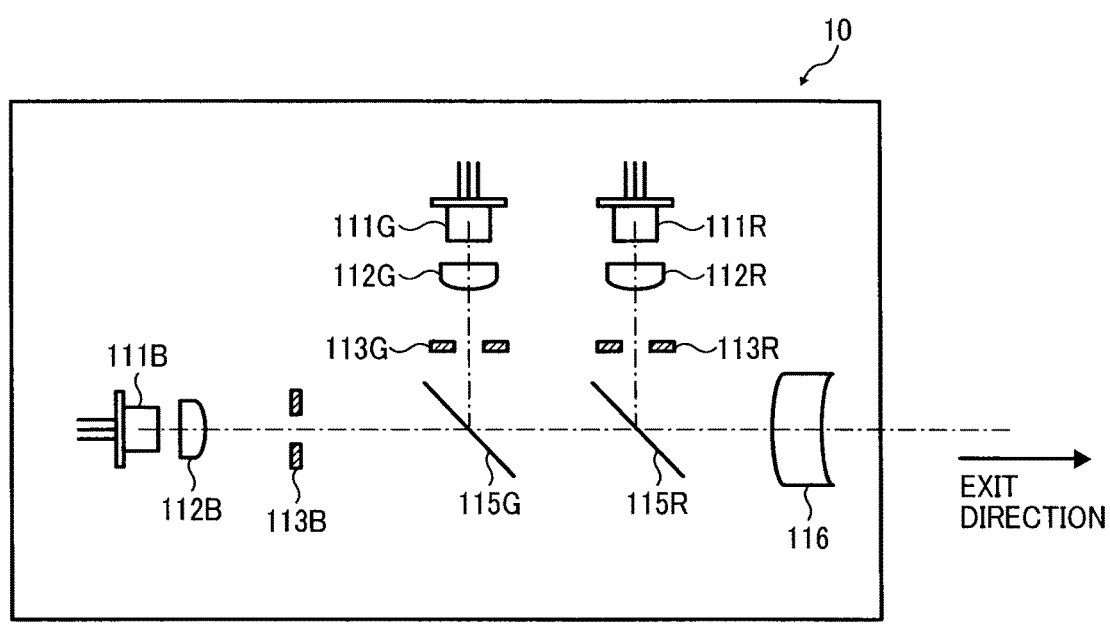
FIG. 4 is a hardware configuration of a light source unit of the HUD of FIG. 1.

As illustrated in FIG. 4, the light source unit 10 emits an image displaying beam to generate the virtual image 2 such as a color image. The image displaying beam is a light beam that is generated by synthesizing light beams of three colors of red (R), green (G), and blue (B).

The light source unit 10 includes, for example, a first laser element 111R, a second laser element 111G, and a third laser element 111B. Further, the light source unit 10 includes, for example, a first coupling lens 112R, a second coupling lens 112G, a third coupling lens 112B, a first aperture-formed member 113R, a second aperture-formed member 113G, and a third aperture-formed member 113B. Further, the light source unit 10 includes, for example, a first synthesizing element 115G, a second synthesizing element 115R, and a condenser lens 116.

(Configuration of Light Emitter)

The light source unit 10 includes, for example, a plurality of semiconductor laser elements that can emit laser light having different wavelength (i.e., different colors) with each other. The semiconductor laser elements include, for example, the first laser element 111R that emits red light, the second laser element 111G that emits green light, and the third laser element 111B that emits blue light, in which each of the first laser element 111R, second laser element 111G, and third laser element 111B emits light having different wavelength (i.e., different colors). Hereinafter, each of the first laser element 111R, the second laser element 111G, and the third laser element 111B may be referred to a "light emitter."

In one example configuration, the first laser element 111R emits red light having a wavelength "$\lambda R$" of 650 nm, the second laser element 111G emits green light having a wavelength "$\lambda G$" of 515 nm, and the third laser element 111B emits blue light having a wavelength "$\lambda B$" of 453 nm. Therefore, the wavelength of the light emitted from the plurality of light emitters configuring the light source unit 10 has a relationship of "$\lambda R > \lambda G > \lambda B$."

Each of the laser elements can employ a laser diode (LD) such as an edge emitting laser (EEL). Further, instead of the edge emitting laser (EEL), each of the laser elements can employ a vertical cavity surface emitting laser (VCSEL) but not limited thereto.

(Configuration of Coupling Lens)

The light source unit 10 includes, for example, the first coupling lens 112R, the second coupling lens 112G, and the third coupling lens 112B to reduce or prevent divergence of laser light emitted from each of the laser elements. As one example configuration, each one of the first coupling lens 112R, the second coupling lens 112G, and the third coupling lens 112B employs, for example, a lens having the focal length of 8 mm.

When the condenser lens 116 is not disposed, the convergence by the first coupling lens 112R, the second coupling lens 112G, and the third coupling lens 112B is adjusted by setting beam waist positions of R, G, and B light with a sequence of R, G, B from the light emitter. Therefore, the degree of convergence of the first coupling lens 112R, the second coupling lens 112G, the third coupling lens 112B becomes higher as the wavelength of light passing through the coupling lens becomes longer.

It is preferable that the beam waist of the light beams emitted from each of the light emitters are matched one to another. However, when the light beam passes through the condenser lens 116, the refractive index of the light beam becomes lower as the wavelength of the light beam becomes longer. Therefore, when the light beams synthesized from the three colors passes through the condenser lens 116, the beam waist of the three light beams may be deviated with each other.

Therefore, as described above, it is designed to set a higher degree of convergence to a coupling lens used for a light beam having a longer wavelength when disposing the first coupling lens 112R, the second coupling lens 112G, and the third coupling lens 112B. With this setting for the light source unit 10, the beam waist of the light beams that pass through the condenser lens 116 can be matched one to another.

(Configuration of Aperture-Formed Member)

The light source unit 10 includes the first aperture-formed member 113R, the second aperture-formed member 113G, and the third aperture-formed member 113B. Each of the aperture-formed members have an aperture to pass through the light beam. When the light beam coming from each of the coupling lenses passes the aperture of the corresponding aperture-formed member, the light flux diameter of each of the light beams (e.g., laser light) can be regulated to a given shape. For example, each of the first aperture-formed member 113R, the second aperture-formed member 113G, and the third aperture-formed member 113B has an aperture of an elliptical shape, and an aperture size of each of the first aperture-formed member 113R, the second aperture-formed member 113G, and the third aperture-formed member 113B can be set, for example, with the following values in the vertical direction and the horizontal direction.

The first aperture-formed member 113R has the aperture having the size of 1.8 mm×3.5 mm (vertical direction× horizontal direction).

The second aperture-formed member 113G has the aperture having the size of 1.6 mm×3.0 mm (vertical direction× horizontal direction).

The third aperture-formed member 113B has the aperture having the size of 1.5 mm×2.6 mm (vertical direction× horizontal direction).

As to the first aperture-formed member 113R, the second aperture-formed member 113G, and the third aperture-formed member 113B, the longer the wavelength of the light that passes the aperture-formed member, the greater the aperture size is set. Each of the aperture-formed member can employ various shapes for the aperture depending on the divergence angle of light flux such as a circle shape, an elliptical shape, a rectangular shape, and a square.

(Configuration of Synthesizing Element)

The light source unit 10 includes the first synthesizing element 115G that synthesizes a laser light flux of the green light shaped by the second aperture-formed member 113G, and a laser light flux of the blue light shaped by the third aperture-formed member 113B. Further, the light source unit 10 includes the second synthesizing element 115R that synthesizes a laser light flux of the light beam synthesized by the first synthesizing element 115G, and a laser light flux of the red light shaped by the first aperture-formed member 113R. Each of the first synthesizing element 115G and the second synthesizing element 115R employs, for example, a dichroic mirror of a plate shape or prism shape. Each of the first synthesizing element 115G and the second synthesizing element 115R can selectively reflect and pass through the light fluxes depending on the wavelength, and synthesize the light fluxes as one light such as the image displaying beam. Therefore, each of the first synthesizing element 115G and the second synthesizing element 115R can be used as a light path synthesizer.

The blue laser light emitted from the third laser element 111B enters the first synthesizing element 115G via the third coupling lens 112B and the third aperture-formed member 113B. The blue laser light that has entered the first synthesizing element 115G passes through the first synthesizing element 115G and travels straight.

The green laser light emitted from the second laser element 111G enters the first synthesizing element 115G via the second coupling lens 112G and the second aperture-formed member 113G. The green laser light that has entered the first synthesizing element 115G is reflected at the first synthesizing element 115G, and then guided to a direction of the second synthesizing element 115R with the blue laser light.

The red laser light emitted from the first laser element 111R enters the second synthesizing element 115R via the first coupling lens 112R and the first aperture-formed member 113R. The red laser light that has entered the second synthesizing element 115R is reflected by the second synthesizing element 115R to the direction that is the same direction of the blue laser light and the green laser light.

Then, the blue laser light and the green laser light that have passed through the second synthesizing element 115R and the red laser light reflected at the second synthesizing element 115R are emitted toward the condenser lens 116 from the second synthesizing element 115R. The laser light emitted from the second synthesizing element 115R becomes one laser light beam synthesized from the red laser light, the green laser light, and the blue laser light.

The laser light emitted from the second synthesizing element 115R that has entered the condenser lens 116 is converted to a parallel beam having a given light flux diameter. The parallel beam is used as the image displaying beam 101.

(Configuration of Condenser Lens)

The light source unit 10 includes the condenser lens 116. The image displaying beam synthesized by the second synthesizing element 115R that enters the condenser lens 116 is emitted from the condenser lens 116 to the light deflector 21, to be described later. The condenser lens 116 employs, for example, a meniscus lens having a concave face at an exit face and a convex face to the light emitter side. Therefore, both of an incident face and an exit face of the condenser lens 116 are the convex face to the light emitter as illustrated in FIG. 4.

By employing this configuration for the condenser lens 116, the light flux diameter of the light that passes through the condenser lens 116 can be reduced. Therefore, the size configuration of the light source unit 10 can be reduced. Further, since the aperture size of the first aperture-formed member 113R, the second aperture-formed member 113G, and the third aperture-formed member 113B of the light source unit 10 can be set greater, the light use efficiency can be enhanced.

Further, the intensity modulation is performed for the laser light flux of each of colors of R, G, B configuring the image displaying beam based on image signals corresponding to "two dimensional color image" that is a target display image, or image data indicating the image information. The intensity modulation of the laser light flux can be performed by directly modulating the semiconductor lasers of each of colors (direct modulation method) or by modulating laser light flux emitted from each of the semiconductor lasers of each of colors (external modulation method).

Each of the light emitter can be driven by a drive unit. Therefore, the drive unit drives each of the light emitter to emit laser light of each of colors processed by the intensity modulation based on image signals of each of colors of R, G, and B.

As to the light source unit 10, the beam waist diameter on the intermediate image screen is set, for example, 134 μm in the main scanning direction, and the beam waist diameter on the intermediate image screen is set, for example, 155 μm in the sub-scanning direction. Therefore, the light source unit 10 has sufficient capabilities to be used as a light source unit of the head up display (HUD) having higher resolution of 60 pixels per degree (ppd) or more.

Further, instead of the above described semiconductor laser elements, light emitting diode (LED) elements can be employed for the light emitters.

(Light Deflector)

Figure 5:
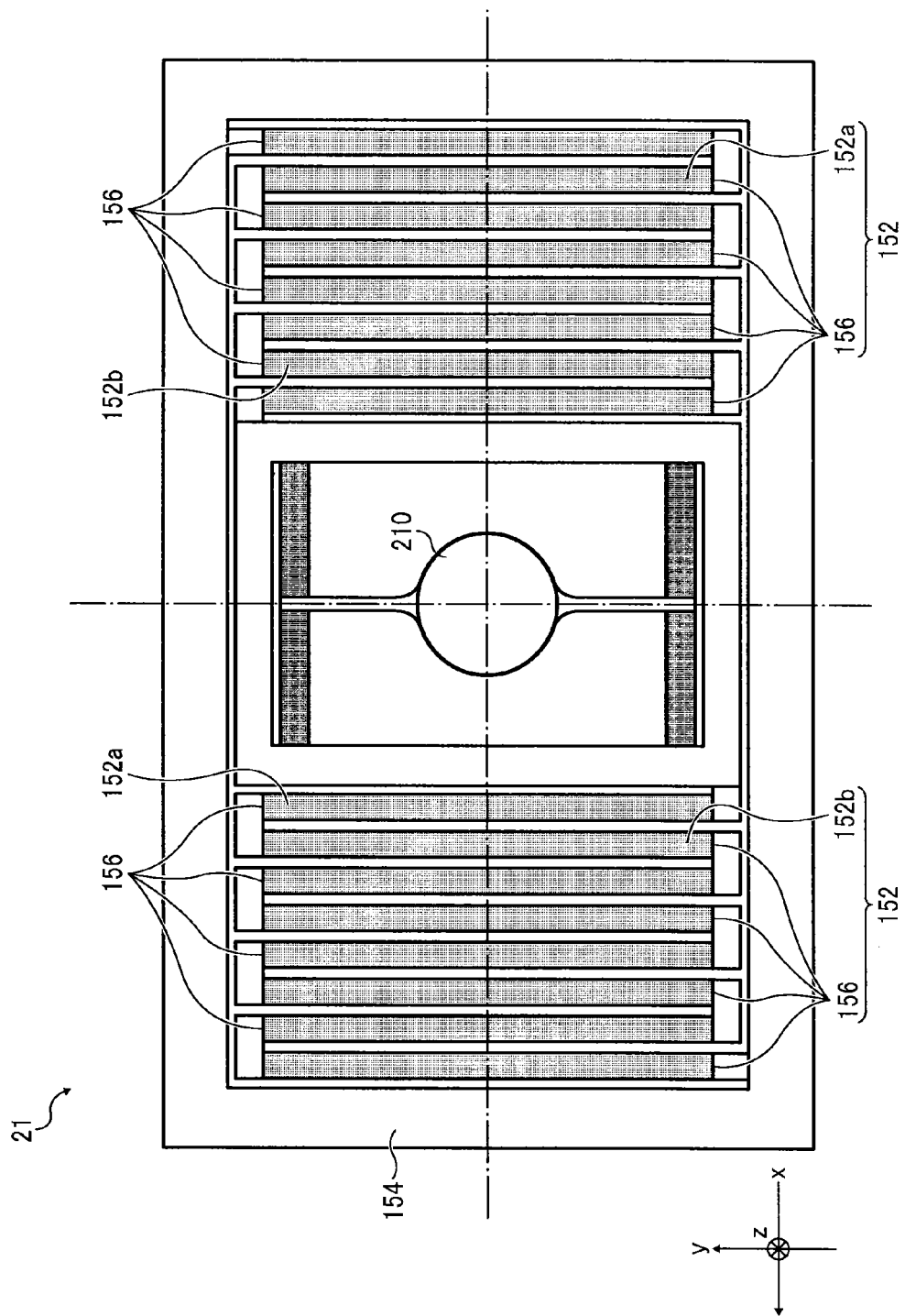
FIG. 5 is an example of an optical deflector of the HUD of FIG. 1.

As illustrated in FIG. 5, the light deflector 21 includes a micro mirror 210, which is a MEMS mirror manufactured by the semiconductor manufacturing process. In the configuration of FIG. 5, the long side direction of the light deflector 21 is set as x-axis, the short side direction of the light deflector 21 is set as y-axis, and the traveling direction of the light reflected at the light deflector 21 perpendicular to the x-axis and y-axis is set as z-axis. The x-axis, y-axis, and z-axis of FIG. 5 are different from the X-axis direction, the Y-axis direction, and the Z-axis direction of FIG. 1.

As illustrated in FIG. 5, the light deflector 21 includes a pair of zigzagged beams 152, in which each of the zigzagged beams 152 is disposed at each side of the micro mirror 210, and each of the zigzagged beams 152 includes a plurality of zigzagged members arranged with a zigzag pattern. As illustrated in FIG. 5, each of the zigzagged beams 152 includes a plurality of first beams 152a and a plurality of second beams 152b, and one first beam 152a and one second beam 152b are set at adjacent positions with each other. Further, the zigzagged beams 152 are supported by a frame 154 as illustrated in FIG. 5.

As illustrated in FIG. 5, a pair of the first beam 152a and the second beam 152b adjacently positioned with each other is disposed with a piezoelectric device 156 such as lead zirconate titanate (PZT). By applying one voltage to the piezoelectric device 156 on the first beam 152a and another voltage to the piezoelectric device 156 on the second beam 152b, which are adjacent beams with each other, warping can be generated at the first beam 152a and the second beam 152b. The adjacent beams can deform different directions with an effect of this warping, and then the micro mirror 210 rotates about the x-axis with a greater angle with an effect of accumulated deformation.

By using the light deflector 21 having the above described configuration, the optical scanning in the vertical direction about the x-axis can be performed with a lower voltage. Further, the optical scanning in the horizontal direction about the y-axis can be performed by a torsion bar connected to the micro mirror 210, in which resonance is used.

(Optical Scanning System and Optical Projection System)

Figure 6:
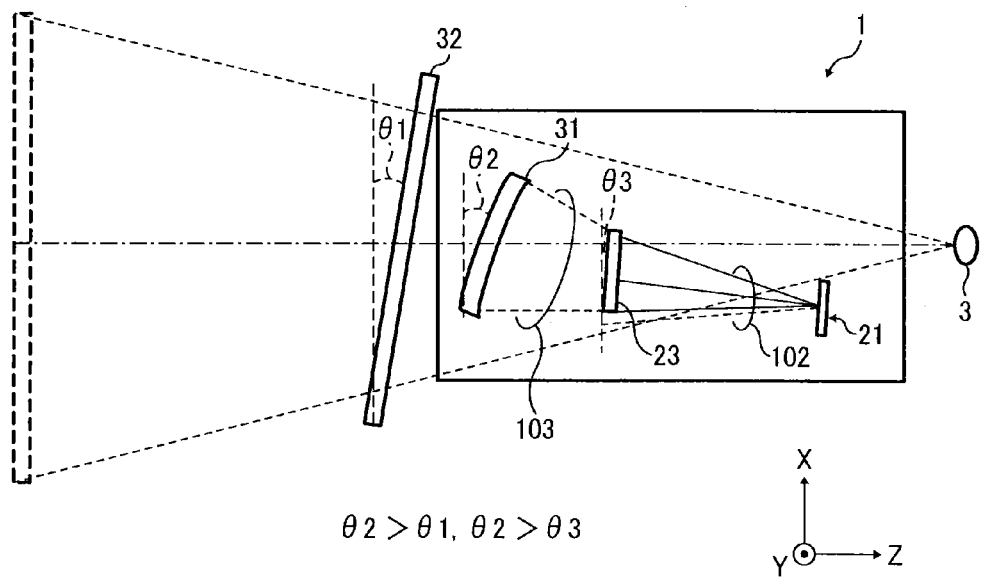
FIG. 6 is a plan view of the HUD viewed from the +Y direction illustrating an optical parts arrangement.

As illustrated in FIG. 6, the HUD 1 includes, for example, the optical scanning system 20 and the optical projection system 30 to generate the virtual image 2 using the light emitted from the light source unit 10, in which the optical scanning system 20 includes, for example, the light deflector 21 and the scan-receiving element 23 used as an intermediate image screen, and the optical projection system 30 includes, for example, the concave mirror 31 and the combiner 32. In the configuration illustrated in FIG. 6, some of the optical elements are omitted from the drawing.

FIG. 6 is a plan view of the HUD 1 viewed from the +Y direction. The size of the HUD 1 can be reduced by setting a smaller size in the vehicle travel direction (Z direction). Specifically, the concave mirror 31 is inclined from the left-to-right direction (X direction in FIG. 6) of the vehicle with a given angle. In this configuration, the concave mirror 31 is inclined from the X direction with inclination angle θ2, the scan-receiving element 23 is inclined from the X direction with inclination angle θ3, and the combiner 32 is inclined from the X direction with inclination angle θ1. In the HUD 1, the concave mirror 31 is disposed by setting the inclination angle θ2 greater than the inclination angle θ1 and by setting the inclination angle θ2 greater than the inclination angle θ3. Therefore, the HUD 1 has an optical configuration having the relationship of "θ2>θ1" and "θ2>θ3."

Numerical Example 1

Table 1 shows one numerical example of the curvature radius R, the face distance D, and the refractive index N for each of face numbers corresponding to components related to each of color light emittable from the light source unit 10 of the HUD 1. In Table 1, the first laser element 111R is referred to "LD: R," the second laser element 111G is referred to "LD: G," and the third laser element 111B is referred to "LD: B."

TABLE 1

| Face number | R (mm) | D (mm) | N (λ) | Remarks |
|---|---|---|---|---|
| LD: B (Designed Wavelength: 453 nm) | | | | |
| 1 | ∞ | 2.17 | — | Light emission point |
| 2 | ∞ | 0.25 | 1.5246 | Cover glass |
| 3 | ∞ | 5.26 | — | |
| 4 | ∞ | 5.00 | 1.5990 | Coupling lens |
| 5 | −6.428 | 0.20 | — | |
| 6 | ∞ | 27.83 | — | Aperture |
| 7 | 4.517 | 3.00 | 1.7589 | Condenser lens |
| 8 | 3.321 | 72.33 | — | |
| 9 | — | — | — | Deflection face |
| LD: G (Designed Wavelength: 515 nm) | | | | |
| 1 | ∞ | 2.27 | — | Light emission point |
| 2 | ∞ | 0.25 | 1.5200 | Cover glass |
| 3 | ∞ | 5.26 | — | |
| 4 | ∞ | 5.00 | 1.5935 | Coupling lens |
| 5 | −6.428 | 0.20 | — | |
| 6 | ∞ | 27.83 | — | Aperture |
| 7 | 4.517 | 3.00 | 1.7501 | Condenser lens |
| 8 | 3.321 | 72.33 | — | |
| 9 | — | — | — | Deflection face |
| LD: R (Designed Wavelength: 650 nm) | | | | |
| 1 | ∞ | 2.39 | — | Light emission point |
| 2 | ∞ | 0.25 | 1.5141 | Cover glass |
| 3 | ∞ | 5.26 | — | |
| 4 | ∞ | 5.00 | 1.5864 | Coupling lens |
| 5 | −6.428 | 0.20 | — | |
| 6 | ∞ | 27.83 | — | Aperture |
| 7 | 4.517 | 3.00 | 1.7390 | Condenser lens |
| 8 | 3.321 | 72.33 | — | |
| 9 | — | — | — | Deflection face |

When the data of Table 1 is applied, the size configuration of the apparatus can be reduced while maintaining higher display quality of the HUD 1 mounted with the light source unit 10.

As to the HUD 1 mounted with the light source unit 10, it is preferable not to include a refractive optical element having a power between the condenser lens 116 and the scan-receiving element 23 to maintain the relationship of the image focus positions between the light beams in the HUD 1.

(Effect)

As above described, as to the HUD 1 mounted with the light source unit 10, the aperture size of the aperture-formed members can be set differently depending on the wavelength of light, with which the beam waist diameter can be reduced, and the deviation between the beams can be reduced, and thereby the size configuration of the apparatus can be reduced while maintaining higher image quality.

Further, as to the HUD 1 mounted with the light source unit 10, since the convergence by the coupling lens becomes different depending on the wavelength of the light emitted from the light emitters, the positions of the beam waist of the light beams can be adjusted at one point in the traveling direction of the light beams emitted from a plurality of the light emitters.

Further, as to the HUD 1 mounted with the light source unit 10, since the same focal length is set for the plurality of coupling lenses, the coupling lenses can be made as the lenses having the same property.

Further, as to the HUD 1 mounted with the light source unit 10, the HUD 1 includes the condenser lens 116 that condenses the light generated by synthesizing light emitted from the plurality of light emitters. Therefore, the magnification ratio of the optical system of the light source unit 10 can be reduced. Therefore, as to the HUD 1 mounted with the light source unit 10, the error sensitivity can be reduced, and the light source unit can be manufactured easily. Further, as to the HUD 1 mounted with the light source unit 10, the numerical aperture (NA) at the image focusing point can be set greater, and thereby the beam waist diameter can be reduced.

Further, as to the HUD 1 mounted with the light source unit 10, the condenser lens 116 employs the meniscus lens having the incident face and the exit face as the convex face with respect to the light emitter as illustrated in FIG. 4. Therefore, the posterior principal point of the condenser lens 116 can be set at the image focusing point side, and the magnification ratio of the optical system of the light source can be reduced. Therefore, as to the HUD 1 mounted with the light source unit 10, the beam waist can be reduced.

Second Example of Light Source Unit

A description is given of a light source unit 11 of a second example of the one or more example embodiment of this disclosure, in which different points from the light source unit 10 of the first example are described.

Figure 7:
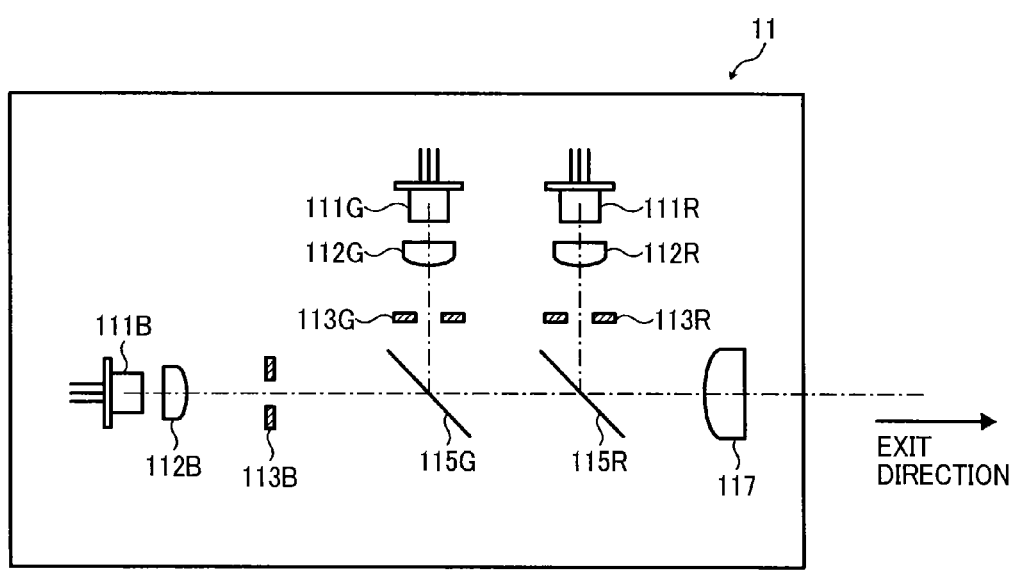
FIG. 7 is a hardware configuration of another light source unit according to one or more example embodiments.

As illustrated in FIG. 7, the light source unit 11 includes a condenser lens 117 that is different from the condenser lens 116 disposed in the light source unit 10. In the light source unit 11, the light beams emitted from the first laser element 111R, the second laser element 111G, and the third laser element 111B are synthesized, and then the synthesized light beam enters the condenser lens 117. The condenser lens 117 is a convex lens having a flat face at the exit face side and a convex face at the light emitter side as illustrated in FIG. 7.

As to the light source unit 11, lights emitted from the light emitters are converted to the substantially parallel light flux by the coupling lenses, and then the light is focused by the condenser lens 117. Since the condenser lens 117 is the convex lens, the numerical aperture (NA) of an optical system of the light source unit 11 that is an optical system of the light source can be set greater compared to a configuration not using the condenser lens 117.

As to the light source unit 11, the beam waist diameter on the intermediate image screen is set, for example, 113 μm in the main scanning direction, and the beam waist diameter on the intermediate image screen is set, for example, 76 μm in the sub-scanning direction. Therefore, the light source unit 11 has sufficient capabilities to be used a light source unit of the head up display (HUD) having higher resolution of 60 pixels per degree (ppd) or more.

(Effect)

As above described, since the beam waist diameter can be further reduced by employing the light source unit 11, the resolution of the HUD 1 mounted with the light source unit 11 can be enhanced.

Further, since the magnification of the optical system of light source can be set smaller by employing the light source unit 11, the effect of the manufacturing error (error sensitivity) can be reduced. Therefore, the image display apparatus mounted with the light source unit 11 can be provided with lower cost.

Numerical Example 2

Table 2 shows another numerical example of the curvature radius R, the face distance D, and the refractive index N for each of face numbers corresponding to components related to each of color light emittable from the light source unit 11 of the HUD 1. In Table 2, the first laser element 111R is referred to "LD: R," the second laser element 111G is referred to "LD: G," and the third laser element 111B is referred to "LD: B."

TABLE 2

| Face number | R (mm) | D (mm) | N (λ) | Remarks |
|---|---|---|---|---|
| LD: B (Designed Wavelength: 453 nm) | | | | |
| 1 | ∞ | 2.35 | — | Light emission point |
| 2 | ∞ | 0.25 | 1.5246 | Cover glass |
| 3 | ∞ | 3.00 | — | |
| 4 | 33.800 | 4.00 | 1.5990 | Coupling lens |
| 5 | −5.170 | 3.45 | — | |
| 6 | ∞ | 66.90 | — | Aperture |
| 7 | 31.906 | 3.00 | 1.5246 | Condenser lens |
| 8 | ∞ | 44.30 | — | |
| 9 | — | — | — | Deflection face |
| LD: G (Designed Wavelength: 515 nm) | | | | |
| 1 | ∞ | 2.43 | — | Light emission point |
| 2 | ∞ | 0.25 | 1.5200 | Cover glass |
| 3 | ∞ | 3.00 | — | |
| 4 | 33.800 | 4.00 | 1.5935 | Coupling lens |
| 5 | −5.170 | 3.45 | — | |
| 6 | ∞ | 68.31 | — | Aperture |
| 7 | 31.906 | 3.00 | 1.5200 | Condenser lens |
| 8 | ∞ | 44.30 | — | |
| 9 | — | — | — | Deflection face |
| LD: R (Designed Wavelength: 638 nm) | | | | |
| 1 | ∞ | 2.51 | — | Light emission point |
| 2 | ∞ | 0.25 | 1.5144 | Cover glass |
| 3 | ∞ | 3.00 | — | |
| 4 | 33.800 | 4.00 | 1.5869 | Coupling lens |
| 5 | −5.170 | 3.45 | — | |
| 6 | ∞ | 40.02 | — | Aperture |
| 7 | 31.906 | 3.00 | 1.5144 | Condenser lens |
| 8 | ∞ | 44.30 | — | |
| 9 | — | — | — | Deflection face |

When the data of Table 2 is applied, the size configuration of the apparatus can be reduced while maintaining higher display quality of the HUD 1 mounted with the light source unit 11.

Second Example of Image Display Apparatus

A description is given of a HUD 100 of a second example of the image display apparatus according to one or more example embodiments of this disclosure, in which different points from the HUD 1 of the first example are described.

Figure 8:
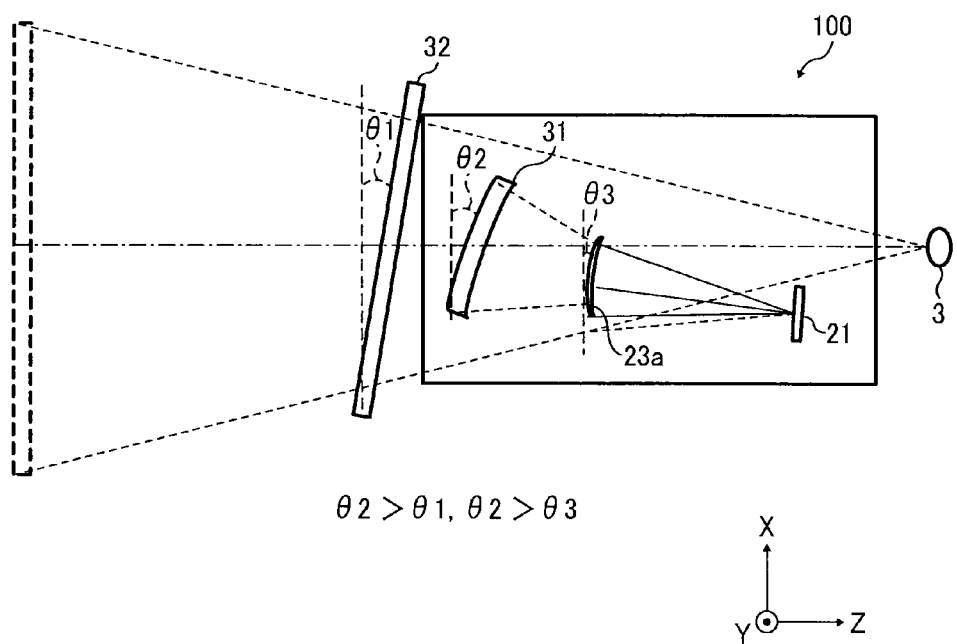
FIG. 8 is a plan view of another HUD viewed from the +Y direction illustrating another optical parts arrangement.

As illustrated in FIG. 8, the HUD 100 includes a scan-receiving element 23a used as the intermediate image screen, which is curved in the main scanning direction different from the scan-receiving element 23 of the HUD 1 of the first example.

In a configuration that the scan-receiving element 23 is scanned directly by the light flux deflected by the light deflector 21, an image may become a curved image (field curvature) caused by deviations of focus points between the scan positions because the distance from the light deflector 21 to the scan-receiving element 23 is different between different image heights. For example, the field curvature increases the beam diameter size.

In light of the field curvature, the scan-receiving element 23a is curved for the HUD 100 in line with the field curvature. The curved shape of the scan-receiving element 23a is preferably an arc shape setting the surface of the light deflector 21 as the center of the arc.

Further, as to the HUD 100, the scan-receiving element 23a can be positioned at a point of 45 mm from the light deflector 21, and the curvature radius R of the scan-receiving element 23a in the main scanning direction can be set to 45 mm, with which the distance from the light deflector 21 to the scan-receiving element 23a and the curvature radius R of the scan-receiving element 23a can be matched.

As above described, as to the HUD 100, the deviations of the beam diameter of the intermediate image on the scan-receiving element 23a can be reduced, and thereby the image display apparatus enhancing the resolution and display quality can be provided.

As to the above described one or more example embodiments, the size configuration of the light source unit can be reduced, and thereby the size configuration of the apparatus employing the light source unit can be reduced. For example, as to the HUD employing the laser scanning system, the size of the light source unit of the HUD can be reduced, and thereby the size effect of the HUD to the configuration of the vehicle mounted with the HUD can be reduced.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A light source unit mountable to an image display apparatus for irradiating scan light to an optical scanning system to generate an image, the light source unit comprising:
    a plurality of light emitters to emit corresponding lights having different wavelengths;
    a plurality of coupling lenses respectively disposed for the plurality of light emitters to respectively pass through the lights emitted from the plurality of light emitters, the plurality of coupling lenses differentiating convergence of the light depending on the wavelength of the lights emitted from the plurality of light emitters;
    a plurality of aperture-formed members respectively disposed for the plurality of coupling lenses to respectively pass through the lights coming from the coupling lenses, each of the plurality of aperture-formed members formed of an aperture having an aperture size set differently depending on the wavelengths of the lights emitted from the plurality of light emitters;
    a light path synthesizer to synthesize the lights coming from the plurality of aperture-formed members; and
    a condenser lens to condense light coming from the light path synthesizer.

2. The light source unit of claim 1, wherein the aperture size of the aperture-formed member is set greater as a length of the wavelength of the light passing through the aperture-formed member is longer.

3. The light source unit of claim 1, wherein the plurality of coupling lenses are set with a same focal length.

4. The light source unit of claim 1, wherein the condenser lens has a convex face facing the light emitters.

5. An image display apparatus comprising:
the light source unit of claim 1 to emit light;
an optical scanning system including a reflection face to generate an intermediate image on a scan-receiving element by changing a direction of the light that has entered the reflection face; and
an optical projection system to display the intermediate image as a virtual image.

6. The image display apparatus of claim 5, wherein the scan-receiving element is curved at least along a main scanning direction.

7. The image display apparatus of claim 5, wherein the image display apparatus is mountable to a vehicle.

8. An image display apparatus comprising:
the light source unit of claim 1 to emit light; and
an optical scanning system including a reflection face to generate an image on a screen by changing a direction of the light that has entered the reflection face of the optical scanning system.

* * * * *